United States Patent [19]

Savarino

[11] Patent Number: 4,633,608
[45] Date of Patent: Jan. 6, 1987

[54] FISH STRIKE DETECTOR

[76] Inventor: Richard Savarino, 2607 E. Carpenter Ave., Cudahy, Wis. 53110

[21] Appl. No.: 722,511

[22] Filed: Apr. 12, 1985

[51] Int. Cl.[4] ............................................. A01K 97/12
[52] U.S. Cl. .......................................................... 43/17
[58] Field of Search ...................... 43/17, 15, 16, 21.2

[56] References Cited

U.S. PATENT DOCUMENTS

| D. 136,856 | 12/1943 | Olowecki | 43/21.2 |
|---|---|---|---|
| 2,654,176 | 10/1953 | Kachelski | 43/17 |
| 3,134,187 | 5/1964 | Blakely | 43/17 |
| 3,321,068 | 5/1967 | Beach | 24/442 |
| 3,680,244 | 8/1972 | Cala | 43/17 |
| 3,740,888 | 6/1973 | Young | 43/17 |
| 4,133,130 | 1/1979 | Young | 43/17 |
| 4,398,185 | 8/1983 | Roberts | 43/17 |

Primary Examiner—Gene P. Crosby
Attorney, Agent, or Firm—Fuller, House & Hohenfeldt

[57] ABSTRACT

A fish strike detector has an arm that is mounted to an electrical actuator switch. A fishing line is looped over the arm. A slight increase in the force in the line is sufficient to displace the arm and thereby actuate the switch to close an electrical circuit. The circuit includes visual and audio indicators that signal a fisherman of the strike on his line. The electrical circuit is enclosed in a case that is releaseably connected to a location most suitable for the application. The toggle of the actuator switch is adapted to removeably mount a variety of interchangeable actuator arms. The present invention is suitable for use with ice fishing tip-ups. In that application, the tip-up mast the actuator arm are connected by tubes placed over the free ends of the mast and arm; the tubes are joined by a flexible string. Releasing the mast by a strike tightens the string to displace the actuator arm.

2 Claims, 5 Drawing Figures

U.S. Patent    Jan. 6, 1987    4,633,608
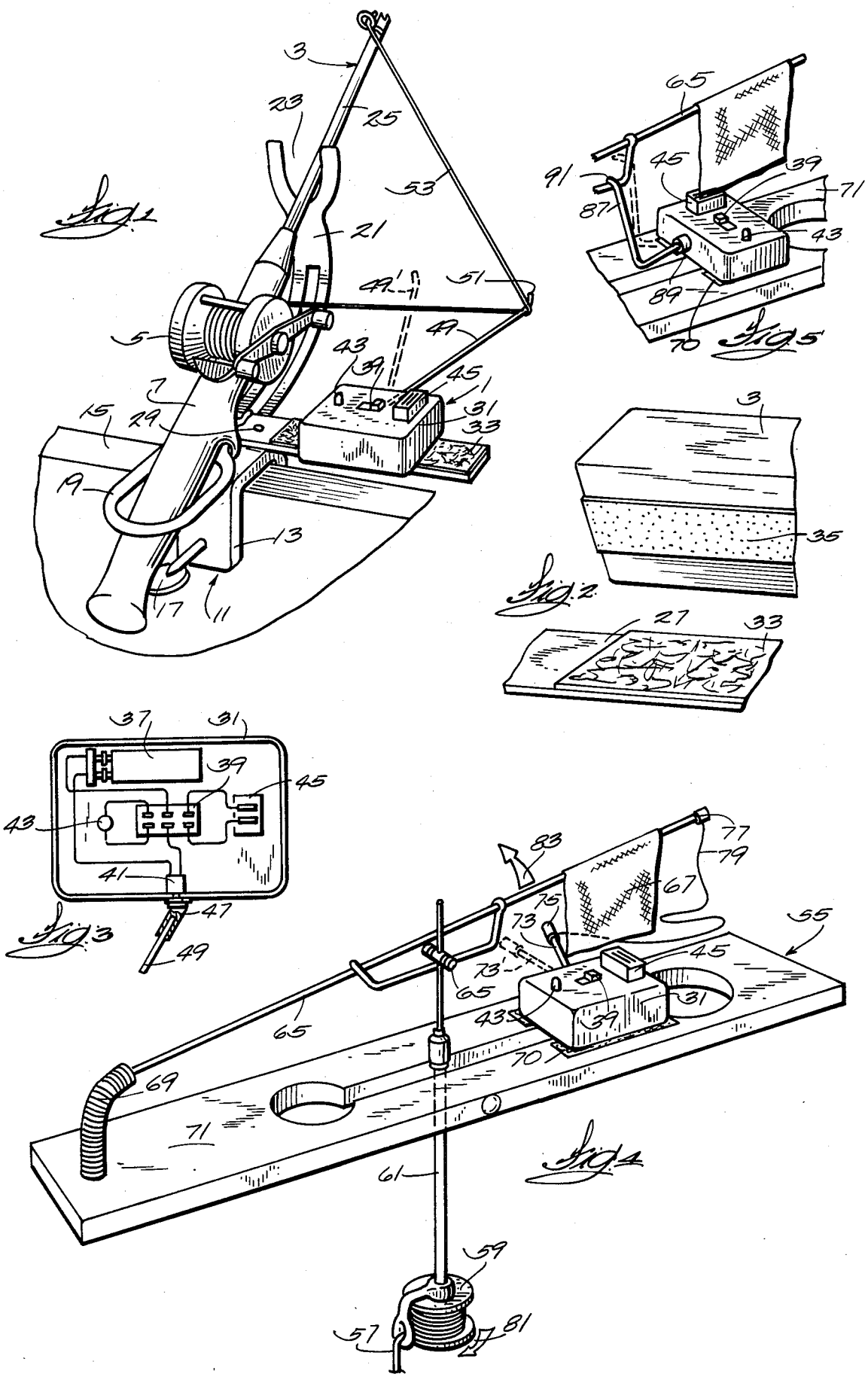

FISH STRIKE DETECTOR

BACKGROUND OF THE INVENTION

1. Field of the Invention.

This invention pertains to signaling apparatus, and more particularly to apparatus for signaling a fisherman that a fish has struck his bait.

2. Description of the Prior Art.

Various equipment has been developed that alerts a fishman to a strike on a line he is not holding. For example, several designs of tip-ups that raise a flag upon a strike are commonly employed by ice fisherman.

It is also known to use a light, often in combination with a sound device, for signaling a fisherman of a strike. One known device employs a bracket that includes a tube for holding a fishing pole handle. Movement of the handle within the bracket under the tug of a fish on the line closes an electrical contact. Voltage from a battery then lights a lamp and energizes a sound device. However, the prior device is not completely satisfactory, because it is not sufficiently sensitive to relatively weak strikes by a fish that do not cause pole movement.

SUMMARY OF THE INVENTION

In accordance with the present invention, a fish strike detector is provided that is capable of signaling the presence of a light strike on a fishing line. This is accomplished by apparatus that includes a sensitive electrical switch that is actuated directly by the fishing line.

The switch forms a portion of an electric circuit that also includes a visible indicator, such as a lamp, and an audio indicator, such as a buzzer. The circuit is powered by a suitable battery. A second switch is employed to select between the visual and audio indicators. The circuit is enclosed in a small and sturdy case with suitable openings therein for the indicator devices and switches.

The strike detecting actuator switch terminates in a short cylindrical toggle lever that is adapted to receive actuating arms of various interchangeable configurations. The arms are bent to suit the particular fishing implement being used, such as a rod and reel or an ice fishing tip-up. With a rod and reel, the arm is formed with a hook at the free end for feeding and holding the fishing line on the arm. Even a relatively weak tug on the line tightens the line to displace the arm and actuate the switch to thereby close the electric circuit. In ice fishing tip-up applications, the free ends of the tip-up mast and actuator arm are linked by a length of string fastened at both ends to a short piece of tubing. One tubing is placed over the tip-up mast and the other tubing is placed over the actuating arm. When the bait is struck, the upward motion of the tip-up mast tightens the string to displace the actuating arm and actuate the actuator switch.

Further in accordance with the present invention, the electrical case is adjustably positionable with respect to the particular fishing device employed. For that purpose, the case is provided with means for releaseably fastening it to the fishing device itself or to a plate that is secured to any suitable rigid structure used to support the fishing pole in place. With the plate in place, the case may be secured thereto at the location best suited for the particular application.

Other aims and advantages of the invention will become apparent to those skilled in the art from the disclosure.

BRIEF DESCRIPTION OF THE DRAWINGS

FIG. 1 is a perspective view of the present invention in operation with a fishing rod and reel held by a stationary bracket;

FIG. 2 is a perspective view of the mounting connection between two components of the present invention;

FIG. 3 is a bottom view, partially in section, of the electrical components of the present invention;

FIG. 4 is a perspective view of the present invention in operation with an ice fishing tip-up; and FIG. 5 is a fragmentary perspective view of a modified embodiment.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a fish strike detector 1 is illustrated that includes the present invention. The fish strike detector 1 is shown in conjunction with a conventional fishing pole 3 having the usual reel 5 and handle 7. The pole 3 is shown held in place by a bracket 11 having a U-shaped channel 13 for grasping the gunnel 15 of a fishing boat; thumb screw 17 holds the bracket 11 tightly to the gunnel 15. The bracket further includes a ring 19, which receives the pole handle 7, and an extension 21 having an end notch 23 therein for supporting the rod end 25 of the pole. It will be understood that the bracket 11 forms no part of the present invention.

The fish strike detector 1 of the present invention comprises a plate 27 that is fastened to the bracket 11 by suitable fasteners 29 and a case 31 that encloses an electrical circuit to be described presently. The plate 27 need not be fastened to the bracket, but it may be fastened to the boat gunnel or any other structure that is rigid with respect to the pole.

The case 21 is mounted to the plate 27 by a releaseable connecting device. In the construction illustrated in FIG. 2, the releaseable connecting device is a pair of Velcro strips, with one strip 33 being bonded to the upper surface of the plate and a matching strip 35 being bonded to the bottom surface of the case.

Referring to FIG. 3, the case 31 encloses electrical components that include a battery 37, a selector switch 39, an actuator switch 41, a visual indicator 43, and an audio indicator 45. Also see FIG. 1. The visual indicator 43 may be a lamp, and the audio indicator 45 may be a buzzer. The selector switch 39 is a two position switch that places either the lamp or the buzzer in the circuit. Actuator switch 41 is a two position switch, displacing the toggle 47 of the actuator switch closes the circuit around the battery 37 and the selected indicator 43 or 45, thereby energizing the lamp or buzzer.

The toggle 47 is preferably of a tubular configuration so that one end of an actuator arm 49 may be inserted snuggly therein. As shown in FIG. 1, the actuator arm 49 lies in a generally horizonal plane, and the free end thereof is fabricated with a hook 51. Displacing the arm and toggle counterclockwise as viewed in FIG.

1 and clockwise as viewed in FIG. 3 actuates the switch 41 from the open to the closed position.

To use the fish strike detector 1 of the present invention, the fishing pole 3 is placed in the bracket 11 or other suitable stationary holder in the usual manner. The plate 27 is secured to the bracket or other holder. The baited fishing line 53 is set to the desired depth in the water. The reel 5 is then unwound an additional amount to create slack in the line, and the slack line is looped over the actuator arm 49 near the free end thereof. To assist retaining the line 53 on the arm, the arm is inserted into the toggle 47 with the hook 51 pointing generally upward. The case 31 is attached on the plate 27 at the most suitable location; the case and plate sides need not be parallel. Perferrably, the switch 41 is located vertically beneath the pole, so that when the switch is in the open position, the arm extends angularly clockwise relative to the pole. The selector switch 39 is set to actuate either the lamp 43 or buzzer 45. The toggle mechanism of the switch 41 is sufficiently strong so that the force normally exerted on the arm by the line 53 with the bait and sinker does not trip the switch. However, when a fish strikes the bait, the force in the line increases such that the arm is displaced horizontally to the position indicated by the phantom lines 49' in FIG. 1, which is angularly counter clockwise relative to the pole. That action actuates the switch 41, and energizes the lamp or buzzer, as the case may be, thereby signaling the fisherman of the strike. As the arm passes through a position vertically beneath the pole, the line is released from the arm and the slack is taken up.

Referring to FIG. 4, a modified embodiment of the present invention is shown in use with an ice fishing tip-up 55 of known design. The fishing line 57 is stored below the ice, not shown, on reel 59. Connected to the reel 59 is a shaft 61, near the upper end of which is fastened a horizontal bar 63. The bar 63 restrains a mast 65 having a flag 67 in a generally horizontal attitude against the force of a spring 69 that tends to raise the mast 65 to an upright attitude. The plate 27 of the present invention is not used with the tip-up application. Rather, one or more Velcro strips 70 are bonded to the tip-up base 71. Additional Velcro strips 35 may be required on the underside of the case 31, FIG. 2. A modified actuator arm 73, which lacks a hook on the free end thereof, is inserted into the actuator switch toggle 47, FIG. 4. A first short tube 75 is slipped over the free end of the arm 73, and a second short tube 77 is slipped over the end of the mast 65. The tubes 75 and 77 and connected by a length of string 79. A strike on the bait causes the reel 59 and shaft 61 to rotate clockwise, as indicated by arrow 81. Rotation of the shaft 61 also rotates the bar 63 to release the mast 65 and thereby permit the spring 69 to raise the mast and flag 67, as indicated by arrow 83. As the mast rises, it takes up the slack in the string 79. When the mast nears the upright attitude, and thus toggle 47 are displaced through the connections provided by the tubes 75 and 77 to the position indicated by phantom lines 73' to actuate the switch 41 and thereby energize the lamp 43 or buzzer 45.

FIG. 5 shows a further modified embodiment in which a stiff wire arm 87 with a hook shaped tip 89 is employed rather than the string illustrated in FIG. 4. The arm 87 is coupled to the toggle switch arm by sleeve coupling 89 in a friction fit.

Thus, it is apparent that there has been provided, in accordance with the invention, a fish strike detector that fully satisfies the aims and advantages set forth above. While the invention has been described in conjunction with specific embodiments thereof, it is evident that any alternative, modifications, and variations will be apparent to those skilled in the art in light of the foregoing description. Accordingly, it is intended to embrace all such alternatives, modification and variations as fall within the spirit and broad scope of the appended claims.

I claim:

1. In combination with an ice fishing tip-up having a mast biased to a vertical position and a fishing line supported by a reel, the reel being adapted to release the mast from a restrained generally horizontal attitude to a vertical attitude upon a strike on the fishing line, a fish strike detector comprising:
    a. a case;
    b. means for releaseably connecting the case to the tip-up at selected locations thereon;
    c. electrical circuit means enclosed within the case for selective operation between a closed energized condition and an open deenergized condition;
    d. an actuator arm having a free end and being displaceable between an unactuated position and an actuated position to close the electric circuit means upon displace to the actuated position;
    e. a first tube placed over the free end of the actuator arm;
    f. a second tube placed over the free end of the tip-up mast; and
    g. a string connected to the first and second tubes, the string having a length slightly shorter than the distance between the free end of the mast when in the vertical attitude and the free end of the actuator arm when in the unactuated position,
    so that a strike on the tip-up releases the restrained mast to raise it and take up the slack in the string and thereby displace the actuator arm to the actuated position and close the electric circuit means.

2. The combination of claim 1 wherein the electric circuit means comprises:
    a. a visible indicator;
    b. an audio indicator; and
    c. a switch for selectively energizing the visible indicator or the audio indicator upon closing of the electric circuit means by the actuator arm to signal the fisherman of the strike.

* * * * *